United States Patent
Schubert et al.

(10) Patent No.: US 7,206,679 B2
(45) Date of Patent: Apr. 17, 2007

(54) RECONFIGURABLE METHODOLOGY FOR EVENT DETECTION IN A MOTOR VEHICLE

(75) Inventors: Peter J. Schubert, Carmel, IN (US);
Mariusz Geborek, Krakow (PL);
Bogdan Kowalczyk, Krakow (PL)

(73) Assignee: Delphi Technologies, Inc., Troy, MI (US)

( * ) Notice: Subject to any disclaimer, the term of this patent is extended or adjusted under 35 U.S.C. 154(b) by 660 days.

(21) Appl. No.: 10/754,055

(22) Filed: Jan. 8, 2004

(65) Prior Publication Data
US 2005/0154509 A1 Jul. 14, 2005

(51) Int. Cl.
*B60R 21/00* (2006.01)
*G06F 19/00* (2006.01)

(52) U.S. Cl. .................. 701/38; 701/46; 280/735; 180/282

(58) Field of Classification Search .............. 701/38, 701/36, 46, 70, 1, 39, 45; 280/735, 5.502, 280/5.506; 180/282; 340/429, 440; 702/141
See application file for complete search history.

(56) References Cited

U.S. PATENT DOCUMENTS

| | | | |
|---|---|---|---|
| 5,482,314 A | 1/1996 | Corrado et al. ............. 280/735 |
| 6,026,340 A | 2/2000 | Corrado et al. ............... 701/47 |
| 6,272,411 B1 | 8/2001 | Corrado et al. ............... 701/45 |
| 6,301,536 B1 * | 10/2001 | Vaessen et al. ............... 701/45 |
| 2003/0093201 A1 | 5/2003 | Schubert et al. | |
| 2004/0181329 A1 * | 9/2004 | Tseng et al. .................. 701/38 |
| 2005/0114072 A1 * | 5/2005 | Choi ......................... 702/141 |

FOREIGN PATENT DOCUMENTS

EP   1628180   2/2006

OTHER PUBLICATIONS

European Search Report for 04078515.6

* cited by examiner

*Primary Examiner*—Tan Q. Nguyen
(74) *Attorney, Agent, or Firm*—Jimmy L. Funke

(57) ABSTRACT

A reconfigurable rollover event detection methodology utilizes an existing body of vehicle sensor data. A number of different algorithms or look-up modules develop rollover detection outputs based on different sets of sensor data, and a meta-algorithm combines the various rollover detection outputs to form a single rollover detection output. The number of individual rollover detection outputs is configurable depending on the extent of the available sensor data in a given vehicle and changes in sensor availability that occur due to sensor and communication failures.

11 Claims, 3 Drawing Sheets

US 7,206,679 B2

RECONFIGURABLE METHODOLOGY FOR EVENT DETECTION IN A MOTOR VEHICLE

TECHNICAL FIELD

The present invention is directed to event detection in a motor vehicle, and more particularly to a rollover detection method that is reconfigurable.

BACKGROUND OF THE INVENTION

Various rollover detection methodologies have been developed for activating electrically deployed rollover safety devices such as air bags, side curtains, seat belt pretensioners and pop-up roll bars. Most such methodologies involve monitoring the roll angle and roll velocity of the vehicle or various acceleration components with suitable sensors, and executing a single path control algorithm from the sensor inputs to the decision output. See, for example, the U.S. Pat. Nos. 6,038,495; 6,192,305; 6,618,656; 6,600,414; 6,584,388; 6,542,792; 6,542,073; and 5,610,575. While conceptually simple, such single path algorithms tend to be expensive to implement because reliability concerns dictate the use of dedicated, and sometimes even redundant, sensors. At the same time, the number of sensors installed in a typical vehicle has expanded rapidly, and there is considerable interest in finding ways of utilizing the existing body of available sensor data without compromising rollover detection reliability.

SUMMARY OF THE INVENTION

The present invention is directed to a reliable, multi-path method of detecting impending vehicle events, rollover in particular, using a body of existing vehicle sensor data. A number of different algorithms or look-up modules develop rollover propensity indications based on different sets of sensor data, and a meta-algorithm combines the various rollover propensity indications to form a single rollover propensity estimate. The number of individual rollover propensity indications is configurable depending on the extent of the available sensor data in a given vehicle and changes in sensor availability that occur due to sensor and communication failures.

BRIEF DESCRIPTION OF THE DRAWINGS

The present invention will now be described, by way of example, with reference to the accompanying drawings, in which:

FIG. 2 is a diagram depicting a portion of the algorithm pertaining to rollover propensity assessment, while FIG. 3 is a flow diagram depicting a portion of the algorithm pertaining to availability assessment.

DESCRIPTION OF THE PREFERRED EMBODIMENT

Figure 1:
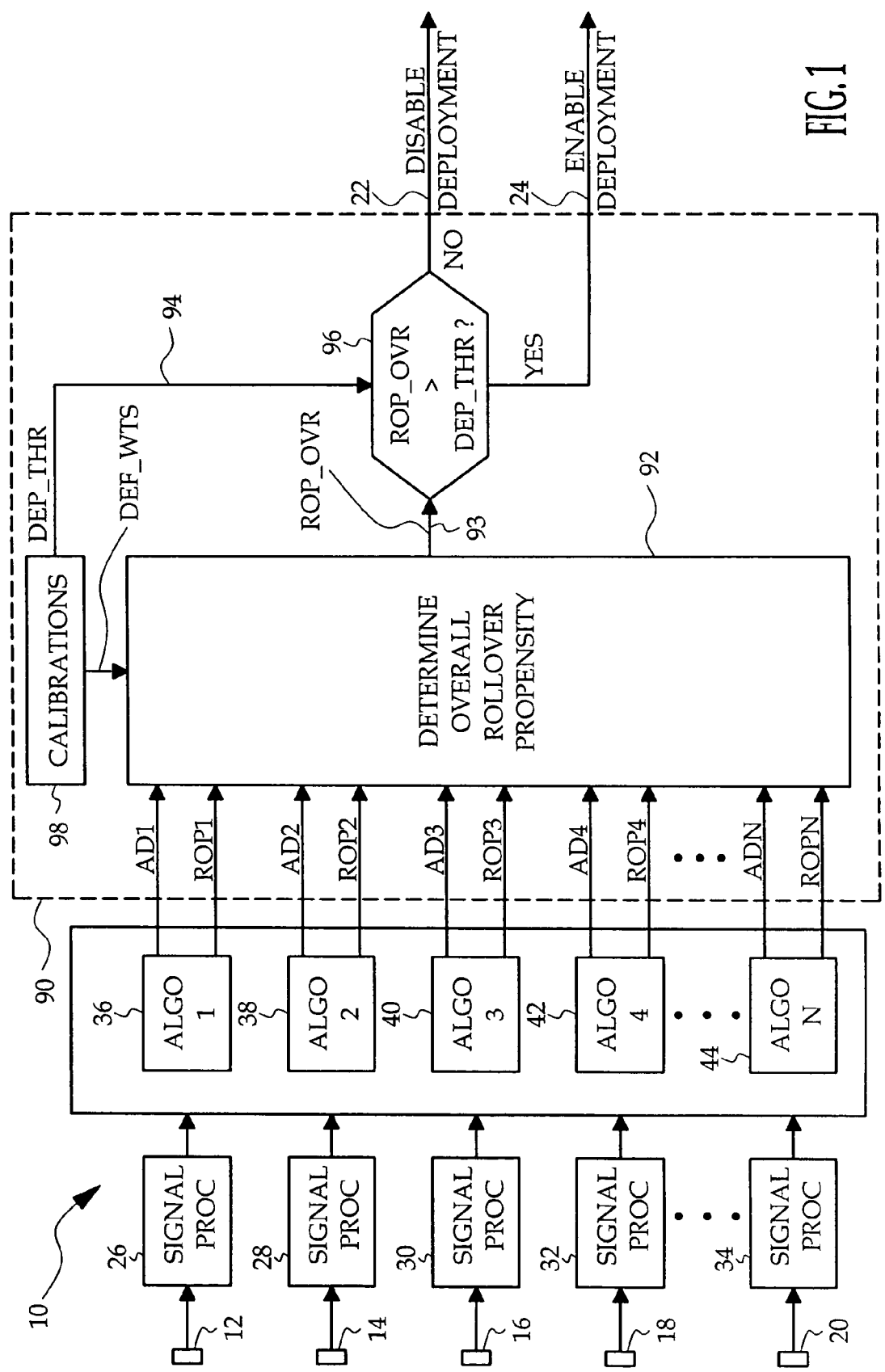
FIG. 1 is a block diagram illustrating the method of this invention.

Referring to the drawings, and particularly to FIG. 1, the reference numeral 10 generally designates a diagram of a vehicle rollover detection methodology according to this invention. The methodology is carried out by an on-board microprocessor-based control unit such as a supplemental restraint controller that selectively activates various rollover restraint devices such as air bags, side curtains, seat belt pretensioners and pop-up roll bars. The inputs include the data developed by various sensors 12, 14, 16, 18, 20, and the outputs include the enable and disable deployment decisions on lines 22, 24.

The sensor data pertinent to rollover detection may include for example, vehicle speed, wheel speeds, roll rate, lateral acceleration, vertical acceleration, yaw rate, steering wheel position, tire pressure, and so on. Any vehicle to which the method of this invention may be applied includes sensors for developing at least some of the data, and the method is configurable as explained below so as to be adaptable to vehicles having different levels of sensor data availability. In other words, it is anticipated that the methodology inputs are predominantly obtained from a body of existing vehicle sensor data which may be supplied to the rollover detection controller by dedicated input lines or by a communication bus that permits sharing of sensor data among multiple controllers in the vehicle, although dedicated sensors may also be utilized.

The input data is subjected to conventional signal processing (low-pass filtering, for example) as indicated by the blocks 26, 28, 30, 32, 34 if not already processed, and then supplied as inputs to various rollover detection algorithms represented by the blocks 36, 38, 40, 42, 44. The rollover detection algorithms may vary in number as indicated, and are known rollover detection algorithms such as those disclosed, for example, in the published U.S. patent application Nos. US2003/0093201A1 and US2003/0158633A1, assigned to the assignee of the present invention and incorporated herein by reference. Each algorithm provides two outputs: an availability determination (AD), and a measure of the rollover propensity or likelihood (ROP). A numerical suffix (1, 2, 3 . . . N) is used to identify the algorithm which produced the output. In general, each AD output represents a yes/no decision made by comparing input signals or computed values to established thresholds; and the ROP output may be based on the magnitudes of the input signals or computed values, their proximity to the respective threshold, and so on. Importantly, the AD output for a given algorithm is NO if the sensor data required for that algorithm is not present or faulty, either because the vehicle is not equipped with one or more of the required sensors, or there is a detected malfunction of a required sensor or a communication bus from which the sensor data is obtained.

Figure 2:
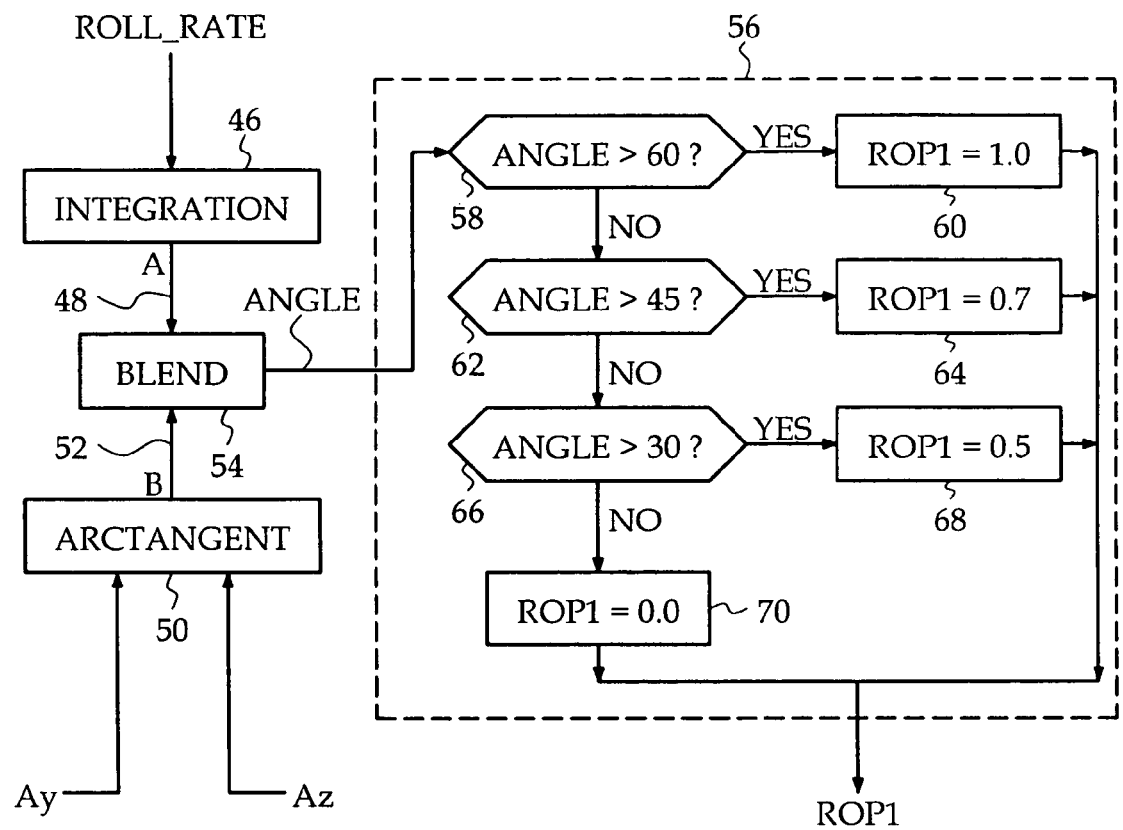
FIGS. 2 and 3 depict an example rollover detection algorithm of block ALGO1 of FIG. 1.
Figure 3:
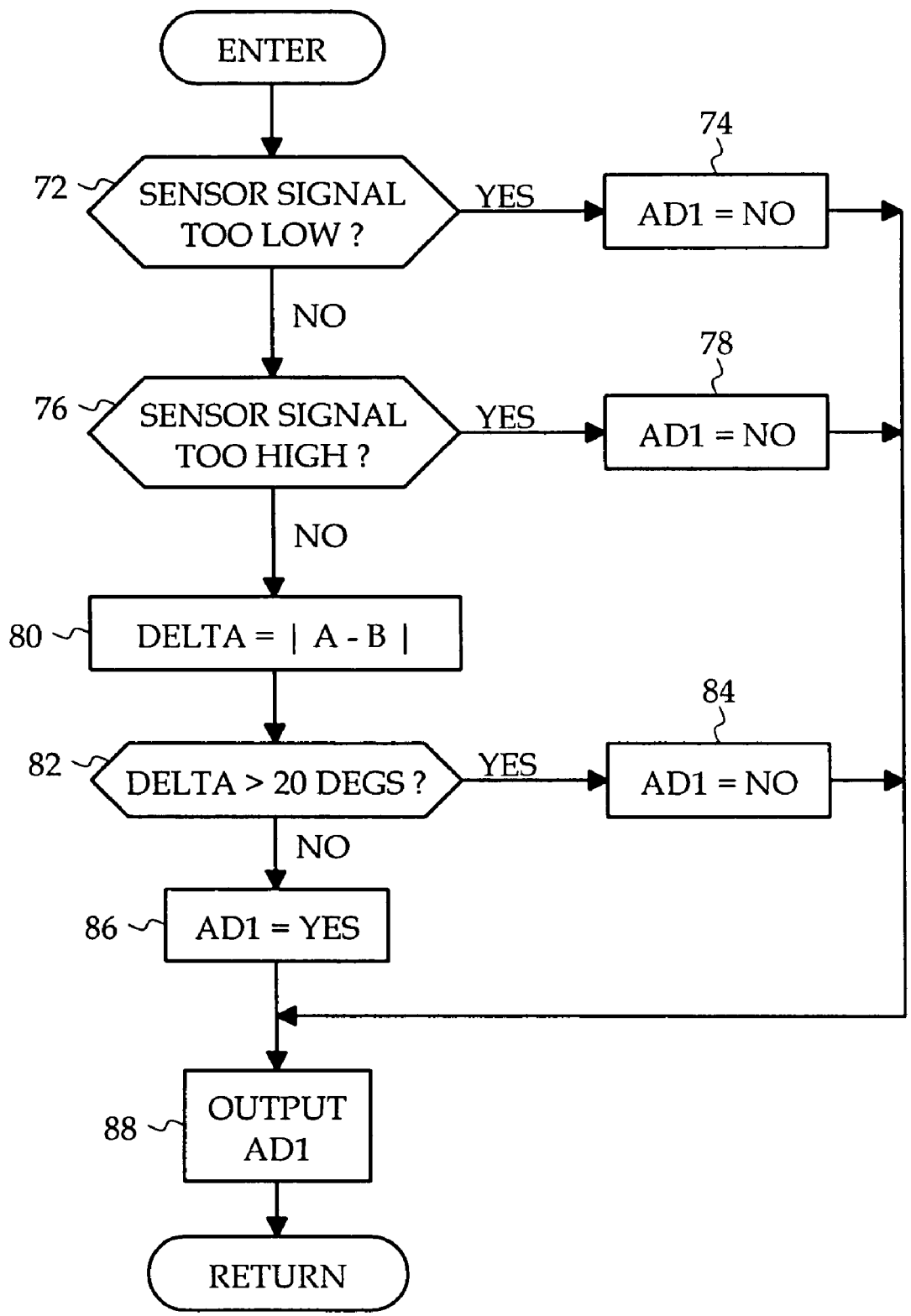

FIGS. 2–3 illustrate an example of a rollover detection algorithm, say ALGO1 (block 36) of FIG. 1. FIG. 2 depicts the rollover propensity determination, while FIG. 3 depicts the availability determination. The illustrated rollover propensity determination requires three processed inputs: vehicle roll rate ROLL_RATE, lateral acceleration Ay, and vertical acceleration Az. The block 46 integrates ROLL_RATE to form a roll angle A on line 48, and the block 50 computes a roll angle B on line 52 based on the arctangent of the quotient Az/Ay. The block 54 forms a composite roll angle (ANGLE) based on the determined roll angles A and B, and the logic defined by the blocks within box 56 determines the rollover propensity ROP1 based on ANGLE. The blocks 58 and 60 set ROP1 equal to 1.0 (highest rollover propensity) if ANGLE is greater than 60°. The blocks 62 and 64 set ROP1 equal to 0.7 if ANGLE is greater than 45° but less than or equal to 60°, and the blocks 66 and 68 set ROP1 equal to 0.5 if ANGLE is greater than 30° but less than or equal to 45°. The block 70 sets ROP1 equal to 0.0 if ANGLE is 30° or less. Concurrently, the blocks 72–88 of FIG. 3 are executed to determine the availability output AD1. The blocks 72, 74, 76, and 78 set AD1 to NO if one or more of the input signals are out of a normal or predefined range. The block 80 computes a difference (DELTA) between the roll angles A and B, and the blocks 82 and 84 set AD1 to NO if DELTA is greater than a reference value such as 20°. Otherwise, the block 86 sets AD1 to YES. And in any event, the block 88 outputs the availability determination AD1.

The above-described availability determinations (AD) and rollover propensity determinations (ROP) are supplied to a meta-algorithm, designated in FIG. 1 by the box 90. The block 92 outputs an overall rollover propensity ROP_OVR on line 93 which is compared to a deployment threshold DEP_THR on line 94. If ROP_OVR exceeds DEP_THR, the decision block 96 produces a deployment command on line 24; otherwise the block 96 produces a disable deployment signal on line 22. Rounding out FIG. 1, the block 98 designates a calibration table for storing the deployment threshold DEP_THR and a set of pre-assigned weights DEF_WTS used by the block 92 in developing ROP_OVR.

Figure 4:
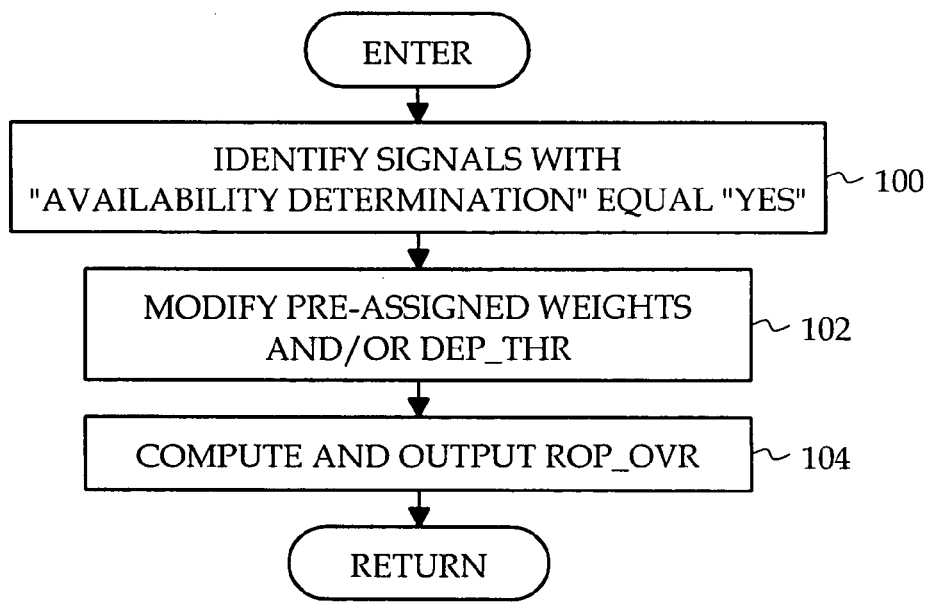
FIG. 4 is a flow diagram illustrating a meta-algorithm of FIG. 1 for combining multiple rollover propensity assessments to form an overall rollover propensity indication.

The flow diagram of FIG. 4 illustrates the method by which block 92 of FIG. 1 determines the overall rollover propensity ROP_OVR. First, the block 100 is executed to identify the rollover propensity algorithms for which the availability determination AD is YES. Algorithms for which the availability determination AD is NO are ignored. As described above in reference to FIG. 3, the availability determination AD is set to NO if a sensor input or algorithm computation is deemed to be unreliable. This can occur due to a sensor or algorithm malfunction, or due to the absence of a sensor input needed by the algorithm. In any event, the block 100 determines the number n and type of available algorithms, and the block 102 assigns weights to the associated rollover propensity outputs. The nominal weights may be pre-assigned for each algorithm to reflect an inherent relative reliability of the algorithm, and stored as calibration values (DEF_WTS) in block 98. In such an implementation, the block 102 modifies the pre-assigned weights to take into consideration the number and type of available algorithms. As indicated at block 102, the deployment threshold DEP_THR may be also or alternatively be modified to take into consideration the number and type of available algorithms. In an exemplary embodiment, the block 102 modifies the pre-assigned weights by dividing each by the number n of available algorithms. For example, the pre-assigned weights WT1, WT2, WT3 and WT4 for ALGO1, ALGO2, AGO3 and ALGO4 are modified to WT1/4, WT2/4, WT3/4 and WT4/4 for the case where block 100 identifies the four input pairs AD1/ROP1, AD2/ROP2, AD3/ROP3 and AD4/ROP4. The block 104 then determines the overall rollover propensity ROP_OVR based on the weighted sum calculation:

$$ROP\_OVR = ROP1\frac{WT1}{4} + ROP2\frac{WT2}{4} + ROP3\frac{WT3}{4} + ROP4\frac{WT4}{4}$$

If a sensor input required by one of the identified algorithms (say, ALGO4) becomes unavailable for some reason, the availability determination AD4 will be set to NO. In this case, block 102 will re-compute the weights for ALGO1, ALGO2 and ALGO3 as WT1/3, WT2/3 and WT3/3, and block 104 will re-compute ROP_OVR based on the weighted sum calculation:

$$ROP\_OVR = ROP1\frac{WT1}{3} + ROP2\frac{WT2}{3} + ROP3\frac{WT3}{3}$$

Of course, more sophisticated methods of computing ROP_OVR may be used. For example, the square root sum of squares calculation:

$$ROP\_OVR = \sqrt{\left(ROP1\frac{WT1}{n}\right)^2 + \left(ROP2\frac{WT2}{n}\right)^2 + \left(ROP3\frac{WT3}{n}\right)^2}$$

can be used to reduce the influence of an individual rollover propensity measure. Additionally, ROP_OVR can be dependent on which algorithms are available, if desired. As a further alternative, the rollover propensity output of each algorithm can expressed as three separate signals: the propensity of a rollover event, the propensity of a non-rollover event, and the probability that rollover and non-rollover events cannot be distinguished. In this case, a Dempster-Shafer data fusion calculation can be used to determine ROP_OVR.

The method of modifying the pre-assigned weights (and/or the deployment threshold DEP_THR) can also be more sophisticated. For example, the modification methodology can assign higher value to certain input signals or algorithms than others; as a result, the methodology might modify the pre-assigned weights differently in cases where the number n, but not the type, of available algorithms is the same. In general, the weight modification $\Delta WTn$ (and/or the deployment threshold modification $\Delta DEP\_THR$) can be a function of n, the weights WT1-WTn, and the availability outputs AD1-ADn.

In summary, the present invention provides an event detection methodology that can be utilized with little or no modification in different vehicles equipped with various numbers and kinds of sensors. The individual event detection algorithms require different sets of sensor input data, and the nominal number of active algorithms in a given vehicle will depend on the number and kind of sensors installed in the vehicle. If software for carrying out the methodology is installed in a vehicle, and certain sensor data becomes unavailable due a sensor or communication bus malfunction, the algorithm(s) requiring the unavailable data becomes inactive as the methodology is automatically reconfigured to produce deployment decisions based on the available sensor data. The methodology is especially useful in rollover detection because nearly all of the sensor data for detecting impending rollover is also present for other vehicle systems such as navigation and electronic stability control; as a result, rollover detection can be added to a well-equipped vehicle essentially for the cost of the software and the associated flash memory.

While the invention has been described in reference to the illustrated embodiment, it should be understood that various modifications in addition to those mentioned above will occur to persons skilled in the art. For example, the disclosed methodology can be applied to vehicle events other than rollover, such as side-impacts or partially overlapping events, the algorithm availability and event propensity outputs may be combined, and so on. Accordingly, it will be understood that methods incorporating these and other modifications may fall within the scope of this invention, which is defined by the appended claims.

The invention claimed is:

1. A reconfigurable method of detecting an impending event in a motor vehicle that is equipped with sensors for measuring various parameters pertinent to said event, comprising the steps of:
   carrying out multiple different algorithms utilizing different sets of data measured by said sensors, each algorithm producing information indicative of algorithm availability and a propensity of said event;
   identifying those algorithms that are indicated to be available and the event propensity information associated with such algorithms; and
   detecting said event based on the identified event propensity information, the number n of identified algorithms, and a predefined event detection threshold.

2. The method of claim 1, where said event is a vehicle rollover event.

3. The method of claim 1, where the information indicative of algorithm availability is determined according to whether the vehicle is equipped with sensors that measure data needed by the respective algorithm.

4. The method of claim 1, where the information indicative of algorithm availability is determined according to whether the utilized sensor data or calculations based on such sensor data are within predefined ranges.

5. The method of claim 1, where the step of detecting said event includes the steps of:
   determining an overall propensity of said event based on the identified propensity information and the number n of identified algorithms; and
   detecting said event when the determined overall propensity exceeds said threshold.

6. The method of claim 5, wherein the step of determining an overall propensity includes the steps of:
   retrieving stored pre-assigned weights for the identified algorithms;
   modifying the retrieved weights based on the number n of identified algorithms; and
   determining said overall propensity based on the modified weights and the identified propensity information.

7. The method of claim 6, where the step of modifying the retrieved weights includes the step of:
   dividing the retrieved weights by the number n of identified algorithms.

8. The method of claim 5, wherein said algorithms include different types of algorithms, and the step of determining an overall propensity includes the steps of:
   retrieving stored pre-assigned weights for the identified algorithms;
   modifying the retrieved weights based on the number n and the type of identified algorithms; and
   determining said overall propensity based on the modified weights and the identified propensity information.

9. The method of claim 1, where the step of detecting said event includes the steps of:
   determining an overall propensity of said event based on the identified propensity information;
   detecting said event based on the determined overall propensity, the number n of identified algorithms, and said predefined event detection threshold.

10. The method of claim 9, including the steps of:
    modifying said predefined event detection threshold based on the number n of identified algorithms; and
    detecting said event based on the determined overall propensity and the modified event detection threshold.

11. The method of claim 9, wherein said algorithms include different types of algorithms, said method including the steps of:
    modifying said predefined event detection threshold based on the number n and the type of identified algorithms; and
    detecting said event based on the determined overall propensity and the modified event detection threshold.

* * * * *